United States Patent [19]
Luther et al.

[11] Patent Number: 5,715,370
[45] Date of Patent: Feb. 3, 1998

[54] METHOD AND APPARATUS FOR EXTRACTING TEXT FROM A STRUCTURED DATA FILE AND CONVERTING THE EXTRACTED TEXT TO SPEECH

[75] Inventors: Willis J. Luther, Irvine; Loren A. Wood, Lakewood; Thomas S. Tullis, Laguna Niguel; James A. Fontana, Mission Viejo, all of Calif.

[73] Assignee: Canon Information Systems, Inc., Costa Mesa, Calif.

[21] Appl. No.: 325,642

[22] Filed: Oct. 19, 1994

Related U.S. Application Data

[63] Continuation of Ser. No. 978,440, Nov. 18, 1992, abandoned.

[51] Int. Cl.[6] .................................. G10L 5/02; G10L 9/00
[52] U.S. Cl. .................................. 395/2.84; 395/2.69
[58] Field of Search .................................. 395/2.84, 2.67, 395/2.69; 381/51–52; 379/88

[56] References Cited

U.S. PATENT DOCUMENTS

| | | | |
|---|---|---|---|
| 4,659,877 | 4/1987 | Dorsey et al. | 379/88 |
| 4,755,932 | 7/1988 | Diedrich | 364/200 |
| 4,942,616 | 7/1990 | Linstroth et al. | 381/51 |
| 5,021,995 | 6/1991 | Quint et al. | 364/900 |

*Primary Examiner*—Allen R. MacDonald
*Assistant Examiner*—Patrick N. Edouard
*Attorney, Agent, or Firm*—Fitzpatrick, Cella, Harper & Scinto

[57] ABSTRACT

Method and apparatus for extracting text from a structured data file and generating synthesized speech in accordance with the extracted text includes a processor for executing stored process steps, a storage device for storing structured data files partitioned into plural types of fields and for storing process steps for execution by the processor, an interface device for accepting a dual tone modulated frequency signal, each dual tone modulated frequency signal representing an operation selection, and a text-to-speech convertor for converting synthesized speech corresponding to a field of a structured data field. The processor selects a structured data file in accordance with a first dual tone modulated frequency operation selection, extracts selected fields from the structured data file in accordance with the stored process steps, generates identification labels for the extracted fields, and controllably outputs the extracted field to the text-to-speech convertor in accordance with a second dual tone modulated frequency operation selection.

27 Claims, 10 Drawing Sheets

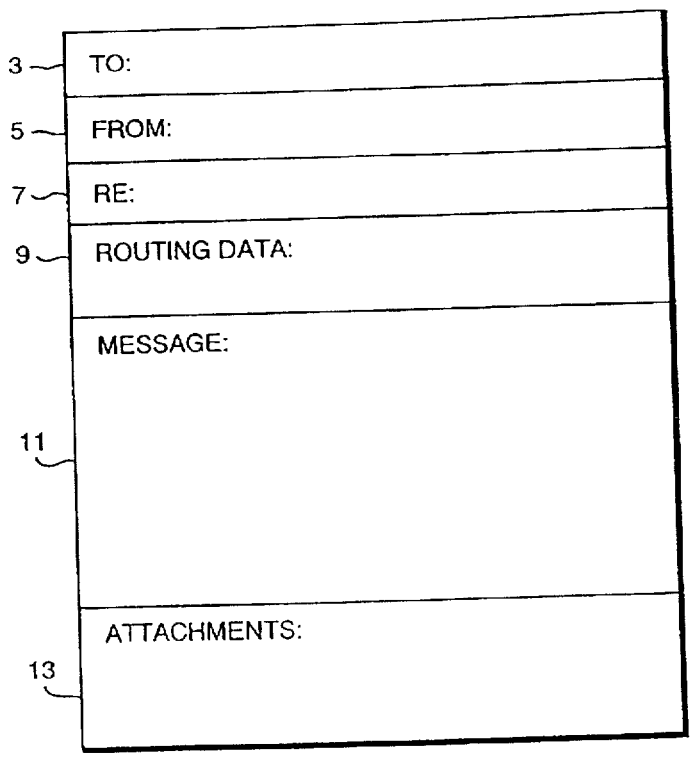

FIG.1 record:mailbox,location:0,sizeType:f,size:64,tuples:no,nextRecType:message.
field:name,location:0,sizeType:f,size:32,speak:Hello.
field:msgCount,location:next,sizeType:f,size:4,speak:you have @ messages.
remark:ignore other mailbox fields record:message,location:next,sizeType:v,size:asDiscovered,tuples:yes,
       extRecType:message,nexTuples:mailbox/msgCount.
field:from,location:0,sizeType:f,size:32,speak:from.
field:to,location:next,sizeType:f,size:32,speak:to.
field:subject,location:next,sizeType:f,size:32,speak:subject.
field:routingSize,location:next,sizeType:f,size:4, ignore.
field:routing,location:next,sizeType:v,size:routingSize,ignore.
field:messageSize,location:next,sizeType:f,size:4,ignore.
field:message,location:next,sizetype:v,size:messageSize,speak:message.
field:numberAttachments,location:next,sizeType:f,size:4,speak:there are
       @ attachments
field:attachment,location:next,sizetype:f,size:32,tuples,yes,
       nexTuples:numberAttachments.

FIG.2 rec:header,loc:0,sizeType:f,size: 64,tuples:no,nxtRecType:date,nxtuples:datecount.
field:datecount,sizeType:f,siz,2.
rem:other fields are not relevant.

rec:date,loc:next,sizeType:f,size:12,tuples:yes,nxtRecType:day,nxtuples:header/datecount.
field:date,loc:3,sizeType:f,size:2,base:days>1/1/1980,speak:date,format:month day, year.
field:marks,loc:5,sizeType:f,size:2,speak:marks,bits:1=trip,2=lunch,4=dinner,8=meeting,16=milestone. — E
field:alarms,loc:7,sizeType:f,size:2,speak:alarms.
field:day,loc:7,sizeType:f,size:2.

rec:day,loc:date/day*64,sizeType:f,size:10,tuples:no,nxtRecType:note,nxtuples:no.
field:notesize,loc:7,sizeType:f,size:2.
field:apptssize,loc:9,sizeType:f,size:2.

rec:note,loc:next,sizeType:v,size:day/notesize,tuples:no,nxtRecType:appt,nxtuples:<day/apptsize.
field:text,loc:1,sizeType:v,size:day/notesize,speak:note.

rec:appt,loc:next,sizeType:v,size:10+appt/size,tuples:yes,nxtRecType:date,nxtuples:header/datecount.
field:size,loc:3,sizeType:f,size:1.
field:flags,loc:4,sizeType:f,size:1,speak:null,number:1=alarm,2=special,3=alarm and special.
field:time,loc:5,sizeType:f,size:2,base:minutes>00:00,speak:time,format hour minutes. — D
field:data,loc:6,sizeType:v,size:<size,speak,speak:null.

FIG.8

METHOD AND APPARATUS FOR EXTRACTING TEXT FROM A STRUCTURED DATA FILE AND CONVERTING THE EXTRACTED TEXT TO SPEECH

This application is a continuation of application Ser. No. 07/978,440 filed Nov. 18, 1992, now abandoned.

BACKGROUND OF THE INVENTION

1. Field of tThe Invention

The present invention relates to a method and apparatus for extracting designated fields from structured data files and converting the designated field into synthesized speech. In particular, the present invention relates to an apparatus and method for remotely selecting fields of a data file and having the text of the selected fields generated into synthesized speech.

2. Description of the Related Art

With the increasing popularity of personal computing equipment, paperless homes and offices are becoming more and more commonplace. For example, personal computing equipment can be used to store calendars for appointments, reminders, meetings, and the like. At the same time, personal computing equipment can be used to carry on electronic correspondence, such as by sending electronic messages, commonly referred to as "E-Mail", to other personal computer users over a local area network or by downloading from an electronic bulletin board. It is also now possible for computers to send and to receive facsimile messages without ever reducing those messages to paper form.

While these paperless systems are quite useful, there are situations where it may be difficult to retrieve needed information. For example, when the user is away from his or her personal computer, information such as a calendar event or an electronic mail message cannot be readily accessed. And even when the user is not away, it can be wasteful to require the user's full attention for manipulation of the computer for access to the information and for viewing the information, especially when the user can more conveniently be performing other tasks.

SUMMARY OF THE INVENTION

The present invention is directed to an arrangement for extracting selectable fields of text data from calendar files, electronic mail files and other structured data files, and feeding the extracted text data to a text-to-speech convertor so that the selected fields are spoken. The speakable text is extracted from the data file in accordance with user selections which may be made remotely. Upon extracting the selected portion of "pronounceable" text, labels which identify the extracted data are generated, and the text and the generated labels are output to a text-to-speech convertor for converting the text to speech. In this manner, a personal computer user can telephone a personal computer and, in accordance with entered selections, the user can hear calendar appointments, electronic messages and other information stored in a structured data file.

Moreover, even for a local computer user, once the user has selected the text fields that are to be extracted, the user can listen to the extracted information while engaged in other tasks, for example, while straightening up an office in preparation for the day's activities.

According to one aspect of the invention, an apparatus for extracting designatable fields of a structured data file which is partitioned into plural types of fields includes a selector for selecting at least one type of field of the structured data file, an extractor for extracting the selected type of field from the structured data file, a generator for generating a field label in correspondence to the selected type of field, and output device for controllably outputting the at least one extracted field.

In another aspect of the invention, an electronic mail text-to-speech apparatus comprises a processing unit and/or calendar file including a computer for executing stored program process steps, a memory for storing structured data files partitioned into plural types of fields and for storing process steps for execution by the process unit, a local area network connected to the processing unit, a telephone interface including a dual tone modulated frequency decoder for decoding a touch tone telephone modulated frequency signal and for providing the decoded signal to the processing unit, and a text-to-speech convertor for converting electrical signals representing synthesized speech which is applied to the telephone interface and which corresponds to text information provided by the processing unit. The process steps include steps to retrieve electronic mail and/or a calendar file, to select types of fields in the electronic mail in response to dual tone modulated frequency commands, to extract the selected fields from the electronic mail, to generate field labels in correspondence to the selected type of field, and, in accordance with dual tone modulated frequency commands, controllably outputting extracted fields to the text-to-speech convertor.

In another aspect of the invention, a method for outputting a selected field from a structured data file comprises the steps of storing structured data files having plural types of fields, replying to an incoming telephone inquiry to playout the data files, accepting playback selection options for selecting at least one type of field, extracting text fields in accordance with a selection option, and playing out extracted field with labels which identify the fields.

In yet another aspect of the invention, an apparatus for extracting text from a structured data file and generating synthesized speech in accordance with the extracted text, comprises processing means for executing stored process steps, storage means for storing structured data files partitioned into plural types of fields and for storing process steps for execution by the processing means, interface means for accepting a dual tone modulated frequency signal which represents a selection, and text-to-speech generating means for generating synthesized speech corresponding to a field of a structured data file. The processing means selects types of fields within a structured data file in accordance with a first dual tone modulated frequency signal, extracts selected fields from the structured data file in accordance with the stored process steps, and controllably outputs the extracted field with labels generated to identify the field to the text-to-speech convertor in accordance with a second dual tone modulated frequency signal.

This brief summary of the invention is provided so that the nature of the invention may be understood quickly. A fuller understanding may be obtained by reference to the following detailed description of the invention in connection with the appended drawings.

BRIEF DESCRIPTION OF THE DRAWINGS

FIG. 1 is a topographical view of an E-mail format template for an E-mail structured data file;

FIG. 2 is an illustration of a computer usable format template for an E-mail data file;

FIG. 8 is an illustration of a computer usable format template for a calendar file.

DETAILED DESCRIPTION OF THE PREFERRED EMBODIMENT

Figure 3:
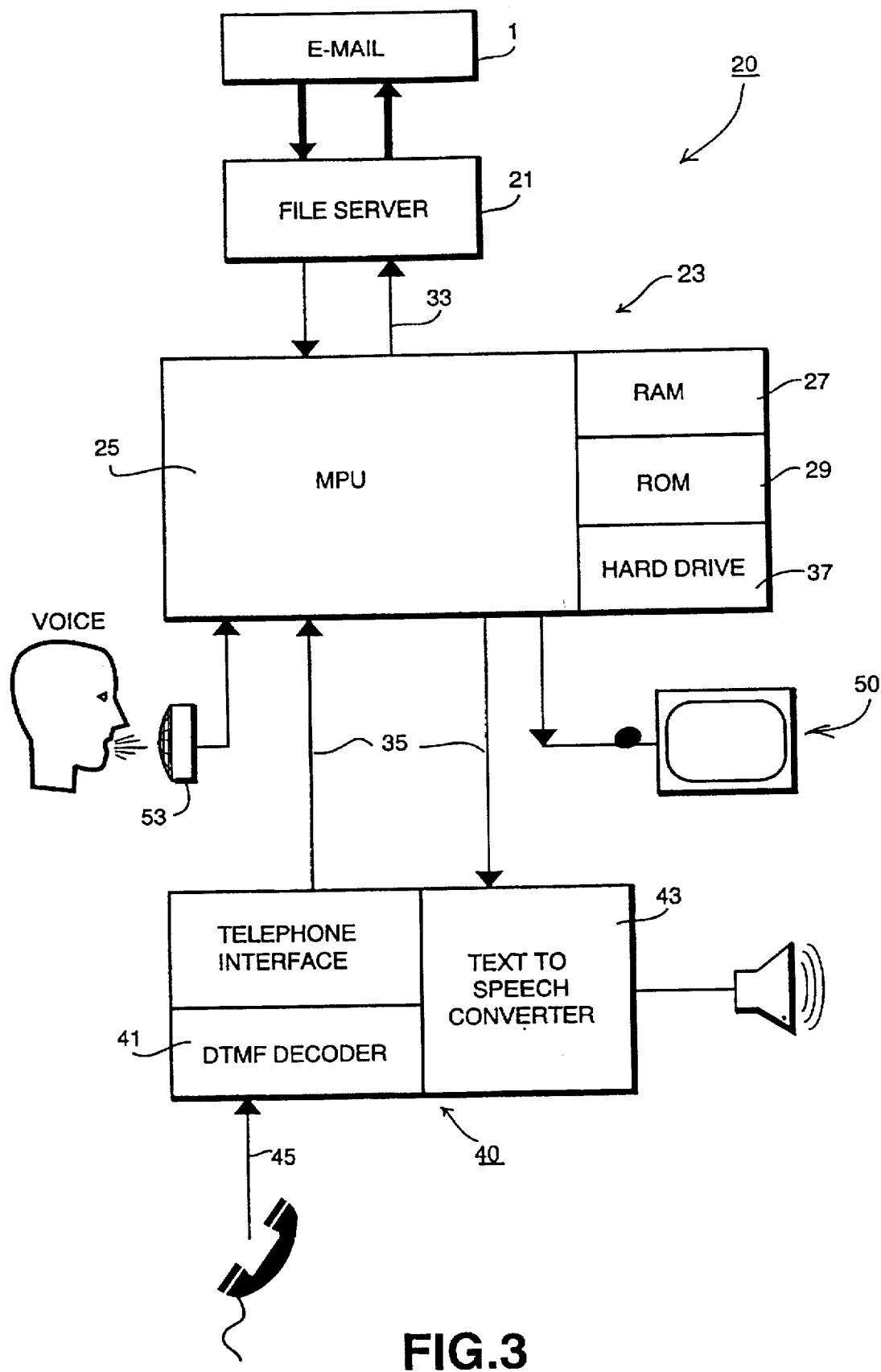
FIG. 3 is a block diagram illustrating the general structure of the first embodiment of the invention.

FIG. 1 illustrates an E-mail format template for a structured data file of an electronic message (hereinafter "E-mail"). E-mail format template 1 defines location position of each field within a structured E-mail data file.

Since E-mail data files within an E-mail software program vary in accordance with each program manufacturer, each E-mail format template 1 must be customized to the E-mail software program used by the customer. That is, an E-mail format template 1 as illustrated in FIG. 1, must be uniquely configured in accordance with the E-mail software program. For example, an E-mail format template for an E-mail data file produced by Mail Handling Systems software will differ from an E-mail data file produced by DaVinci E-mail software.

The E-mail format template which provides field location mapping will be explained with respect to the topographical illustration in FIG. 1. As shown in FIG. 1, E-mail data file 1 consists of a first field 3 which delineates "To" whom the message is sent, second field 5 which delineates "From" whom the message is being sent, and third field 7 which delineates the subject matter of the E-mail (identified as "Re"). Fourth field 9 designates routing information and usually includes "unpronounceable" and unrecognizable information which is not displayed to an E-mail receiver. Fifth field 11 includes the "message". Sixth field 13 includes "attachments", if applicable. If an attachment is included, sixth field 13 includes an address of the attachment as stored in a file server.

In more detail, each field discussed above may be stored in memory in computer usable form as a format template which provides, size, and location information. In some instances, the field will also include text to be spoken. FIG. 2 provides an illustration of the computer usable format template 3. Each field consists of location, size, type of information and, in some cases, text to be spoken prior to reading the data from the structured data file. For example, in FIG. 1, fifth field 11 includes the "message" field. In FIG. 2, fifth field 11 is represented in computer usable format template 3 at reference letter C. The computer usable information at reference letter C allows the computer to locate the "message" within an E-mail structured data file. The information further includes details such as the size of "message". Additionally, prior to speaking the text located at location 11, the computer will be prompted to send ASCII text for the word "message" to the text-to-speech convertor.

FIG. 3 depicts the general structure of a first embodiment of the invention in which selected fields from structured data files such as an E-mail data file are extracted and provided to a text-to-speech convertor. Upon sending an E-mail data file through a local area network, the E-mail data file is sent to a designated "mailbox" for a particular receiver/user. The "mailbox" resides in a local area network file server, such as a file server 21.

File server 21 is connected to local area network (LAN) 33 wherein file server 21 serves as a library to store data files such as E-mail files. File server 21 also serves to store E-mail template 1. LAN 33 provides file server 21 with access to a plurality of personal computer terminals, such as personal computer 23. After receiving an E-mail file and storing the E-mail file in memory, file server 21 would notify a personal computer that an E-mail message is stored in its designated "mailbox". In the configuration illustrated in FIG. 3, file server 21 would notify personal computer 23 that E-mail has been sent and stored in its designated "mailbox".

Personal computer 23 may comprise a standard PC work station. Personal computer 23 includes microprocessor 25, random access memory (RAM) 27, read only memory (ROM) 29, and hard disk 31. Personal computer 23 is coupled to file server 21 via LAN 33. Also coupled to personal computer 23 is serial line 35 which is connected to telephone interface 40. Other peripheral devices such as display 50 and voice activated speech decoder 53 may be connected to personal computer 23 to assist in message retrieval.

Notification of an E-mail message is sent to personal computer 23. A received notification increments a counter (not shown) within personal computer 23 and the current number of messages counted by the counter is periodically output and stored in RAM 27.

Figure 4:
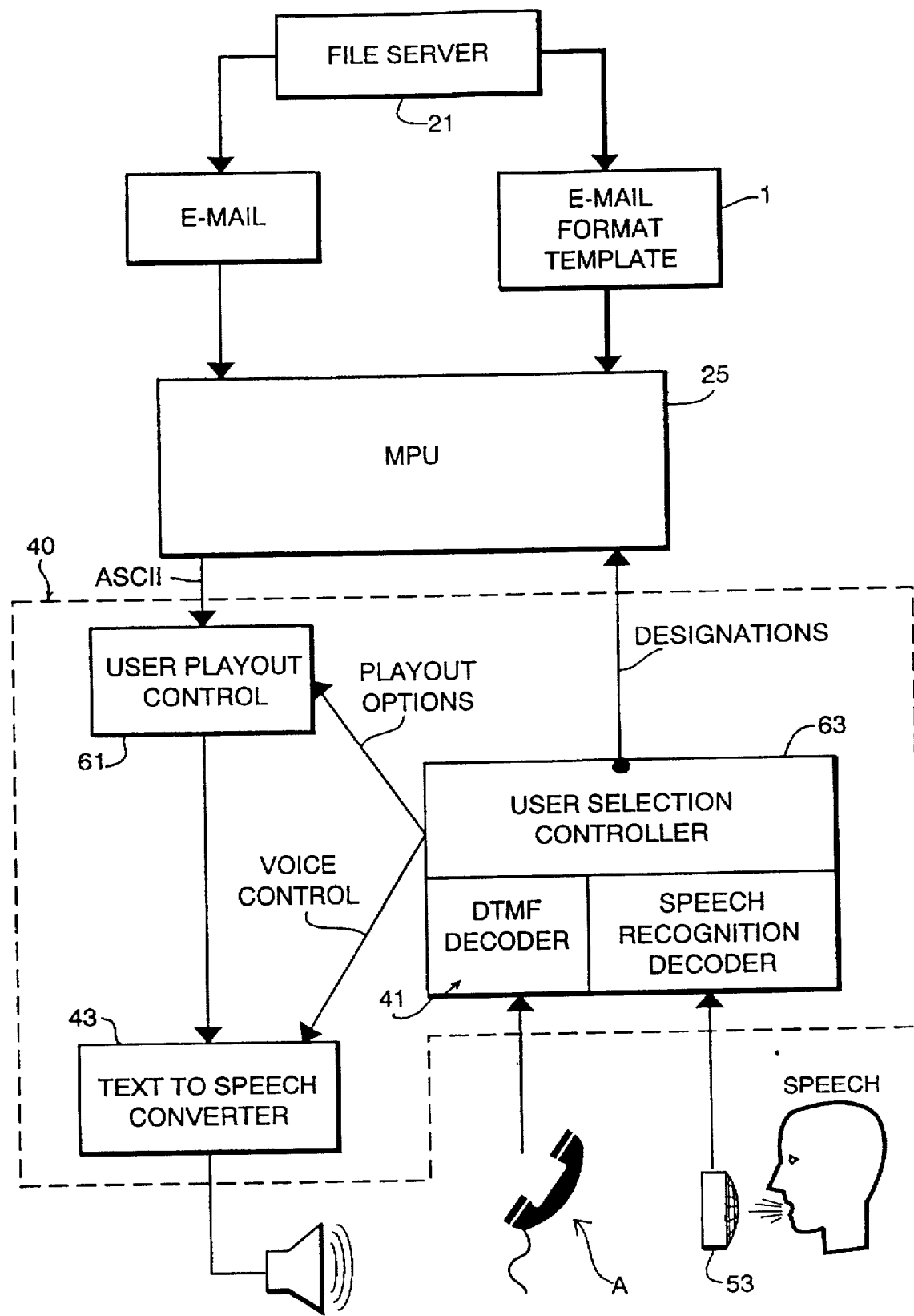
FIG. 4 shows a functional block diagram used for explaining operation of the first embodiment of the present invention.

FIG. 4 shows a functional block diagram of microprocessor 25 and telephone interface 40 of the present invention. A user who wishes to retrieve messages remotely utilizes touch-tone telephone A at the remote location to send an inquiry to personal computer 23. An incoming telephone inquiry is received by telephone interface 40. Reverting to FIG. 3, telephone interface 40 includes dual tone modulated frequency decoder (hereinafter "DTMF") 41, text-to-speech convertor 43 and telephone line 45. Telephone interface 40 answers the incoming call and simultaneously notifies personal computer 23 that a telephone inquiry has been received. Concurrently, telephone interface 40 sends a request to microprocessor 25 to retrieve prestored menu selections.

Microprocessor 25 receives inquiries from telephone interface 40 via serial line 35. Upon receiving notification that a telephone inquiry has been received, microprocessor 25 retrieves stored process steps from ROM 29. The stored process steps include steps to retrieve ASCII text from nonvolatile memory, such as file server 21. The stored ASCII text includes menu selections. These menu selections are sent to text-to-speech convertor 43 to be spoken. Each menu selection prompts the user to enter a selection by depressing touch-tone buttons. For example, the pre-stored steps request that the user enter an alphanumeric password.

In the case a password is required, the user gains access to personal computer 23 by depressing touch-tone numbers on telephone A. The depressed touch-tone numbers produce DTMF frequencies which correlate to a personalized password. Telephone interface 40 which receives the entered password as tones sends these tones to DTMF decoder 41. The decoded signals are sent to microprocessor 25 for comparison. Microprocessor 25 compares the input password with a stored password stored in non-volatile memory, such as hard disk 31.

After access is permitted by microprocessor 25, microprocessor 25 retrieves a user menu selection from file server 21. The stored menu selections contain selection options for selecting fields, such as "To/From only", "subject matter", "messages", "urgent messages", "new mail only", etc., are examples of pre-stored selections in file server 21. The user menu selection is sent to text-to-speech convertor 43 to be spoken. The menu selections are received by text-to-speech convertor 43 which outputs spoken menu selections through telephone line 45 to telephone A.

In response to the menu selections, the user depresses touch-tone keys to enter a selection. The tone produced is decoded by DTMF decoder 41 and sent via serial line 35 to personal computer 23. DTMF decoder 41 interprets each DTMF frequency as a command. Each command which correlates to a playout selection is then sent to microprocessor 25.

Microprocessor 25 performs an extraction sequence in accordance with the user selection. In more detail, microprocessor 25 retrieves from file server 21 structured data files according to each user selection and stores the files in RAM 27. In addition to retrieving the structured data files, microprocessor 25 also retrieves E-mail format template 1 from file server 21 and stores the format template in RAM 27.

E-mail format template 1 serves as a map by which microprocessor 25 locates each field within an E-mail structured data file. In accordance with a user's selection, microprocessor 25 uses position information in E-mail format template 1 to scan, locate, and extract a desired field. Furthermore, microprocessor 25 will retrieve from file server 21 ASCII text identifier labels to attach to a field if indicated in the E-mail file format template 14 (as shown in FIG. 2). After attaching the ASCII field identifier labels to the selected text field(s), each identifier and field is downloaded to telephone interface 40. Telephone interface 40 includes user playout controller 61. User playout controller 61 plays out each selected field in accordance with a user's selection entered by user selection controller 63.

Additionally, after each selected field is downloaded to telephone interface 40, microprocessor 25 retrieves pre-stored playout option selections from file server 21 and automatically sends these selections to text-to-speech convertor 43 to be converted to speech. After hearing the selection menu, the user enters a playout selection option by depressing touch-tone buttons. The tone produced is decoded by DTMF decoder 41. User playout controller 61 outputs the selected text field to text-to-speech convertor 43 in accordance with the decoded command playout option.

User selection controller 63 also allows the user to select voice control options. Voice control options are stored in non-volatile memory, such as file server 21, and are played out to the user by text-to-speech convertor 43 at the beginning of the user playout control menu. The voice control options allow the user to change the monotonous synthesized speech into a more desirable speech pattern.

In addition to the above features, E-mail text-to-speech convertor 20 may also include an optional voice recognition decoder 53 which will accept and decode spoken commands.

The above configuration can, of course, be operated locally through user commands entered by keyboard or spoken commands entered by a voice recognition decoder. In this fashion, a user may operate personal computer 23 locally while performing other tasks.

Figure 5A:
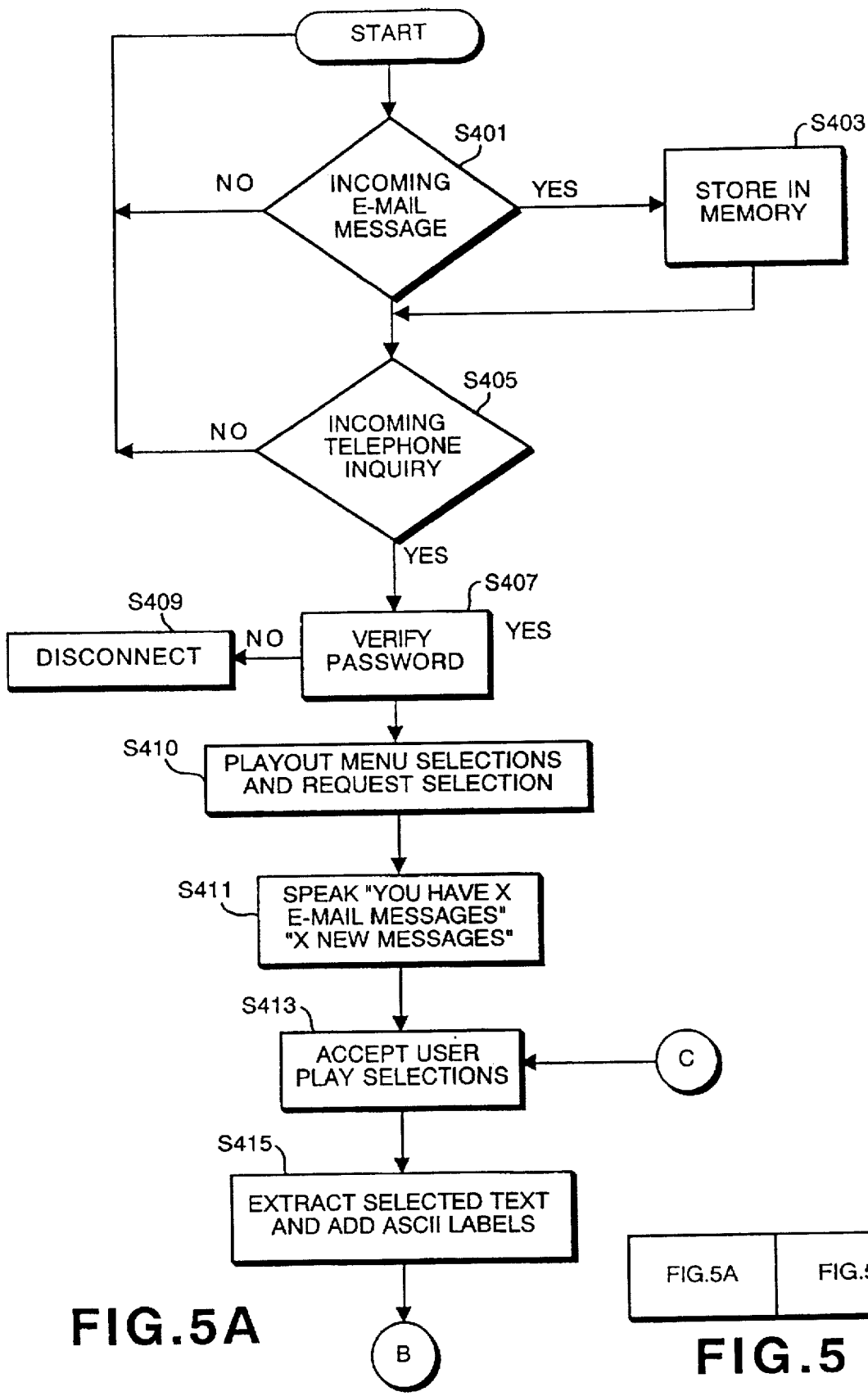
FIG. 5A and 5B show a flow diagram which illustrates the operation of remote retrieval of E-mail messages.
Figure 5:
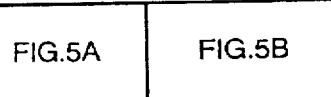
Figure 5B:
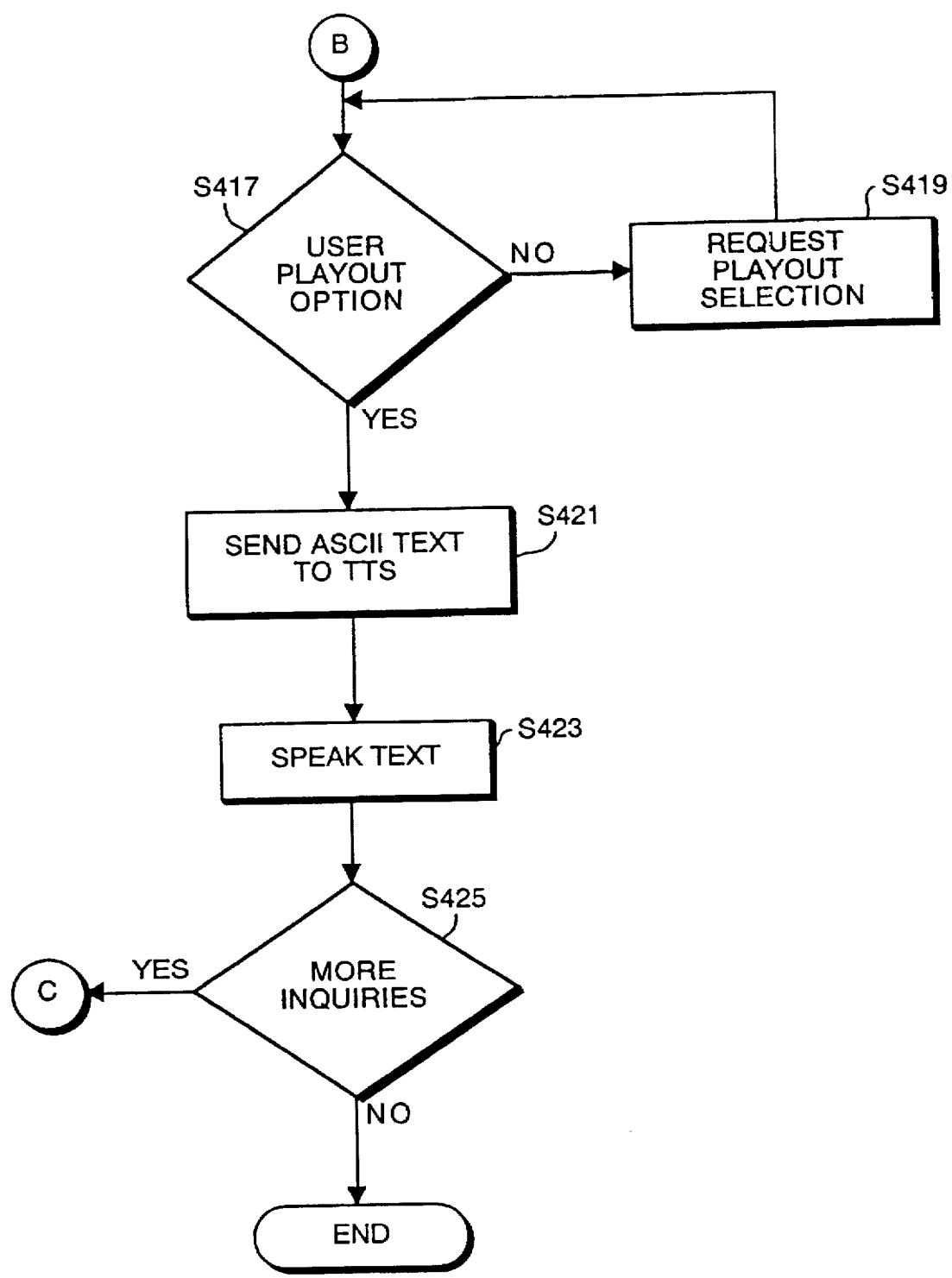

The flow diagram illustrated in FIG. 5A and 5B illustrate the operation of remote retrieval of E-mail by E-mail text-to-speech convertor 20. In step S401, the LAN file server 21 determines whether there are any incoming E-mail messages to be stored. In the case that there are E-mail messages, the E-mail file will be stored in a "mailbox" for the designated personal computer in step S403. On the other hand, if it is determined that there are no E-mail messages to be stored, then the flow returns to step S401.

In step S405, personal computer 23 determines whether there are any incoming telephone inquiries. Until a telephone inquiry is detected in step S405, personal computer 23 simply reinitiates its line monitoring operation and remains in a line monitor loop until an incoming telephone inquiry is detected. When a telephone inquiry is detected by telephone interface 40, this detection is sent to personal computer 23 and flow advances to step S407. In step S407, microprocessor 25 sends a request verification to the caller for a user password. In the case that a user password is not identified in step S407, the telephone is disconnected in step S409.

However, in the case that the password is identified, flow advances to step S410 at which point microprocessor 25 retrieves from file server 21 stored menu selections which are sent to text-to-speech convertor 43 to be spoken. After the menu is output, microprocessor 25 checks the stored message count in RAM 29 in step S411. In the case the message counter contains a number, microprocessor 25 generates ASCII text which automatically reports to the user that there are "X" number of new messages. However, if no number is stored in RAM 29, microprocessor 25 retrieves and sends ASCII text to the text-to-speech convertor 43 which reports to the user that "there are no new messages".

In step S413, if there are messages, the user enters selections in accordance with pre-stored speech generated menu selections. These selections may include which portions of the message to read out, to disconnect, to extract only the to/from fields, to extract only urgent messages, to extract messages only, etc.

Upon receiving the selections, microprocessor 25, utilizing E-mail format template 1, extracts the selected text in step S415 and attaches the ASCII label to the extracted text. If in step S415 a playout option has not been selected, then step S417 requests the user to select a playout selection and flow returns to step S415. If the playout selection is selected, then the extracted text field and generated ASCII portions are sent to text-to-speech convertor 43 in step S421 to be spoken.

After the extracted text is spoken in step S421, microprocessor 25 queries the user as to whether any further messages are to be retrieved. If it is determined that a further request for messages is made, then flow returns to step S413. However, if the user indicates that no further messages are required, then flow simply ends and telephone line 45 is disconnected.

The foregoing list of commands is representative only and other commands may be provided by microprocessor 25. However, if microprocessor 25 does not recognize a command, then flow simply returns to step S410 where the line loop is reinitiated.

Figure 6:
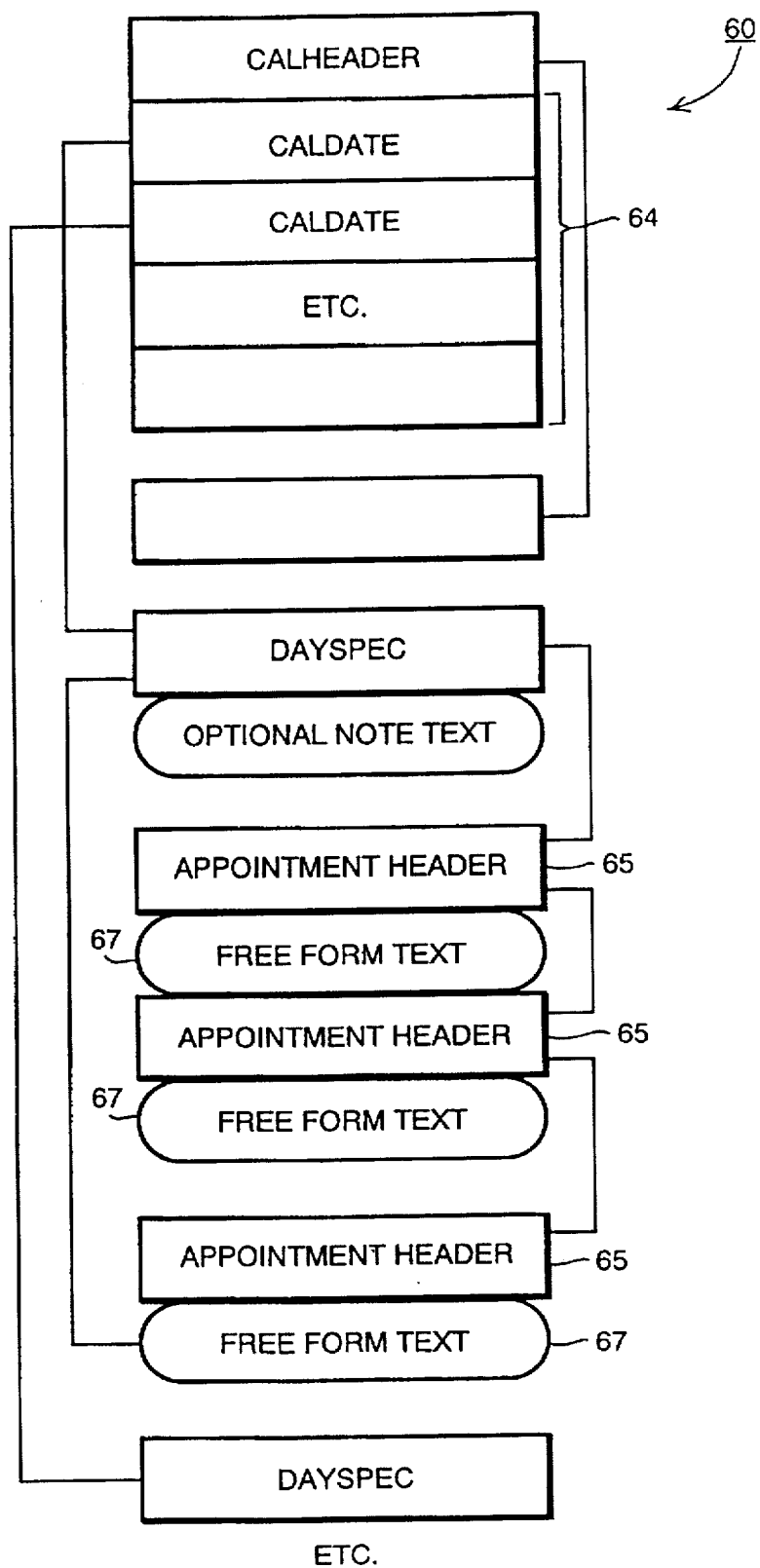
FIG. 6 illustrates the format of a structured data file used to store calendar files.

A second embodiment of the present invention is described with reference to FIGS. 6-8. Referring to FIG. 6, there is illustrated calendar format file 60. Calendar format file 60 consists of hierarchical fields which are interrelated by date, time and appointment. The type of calendar format file may differ depending on the type of software utilized. For example, the calendar format illustrated in FIG. 6 is published by Microsoft.

Each calendar format file 60 includes calendar date 64, time 65 and appointment information 67. A personal computer user stores the calendar format file in memory, such as on the network file server 21 or local hard disk 31, and upon request can retrieve the information for a desired date and time.

Figure 7:
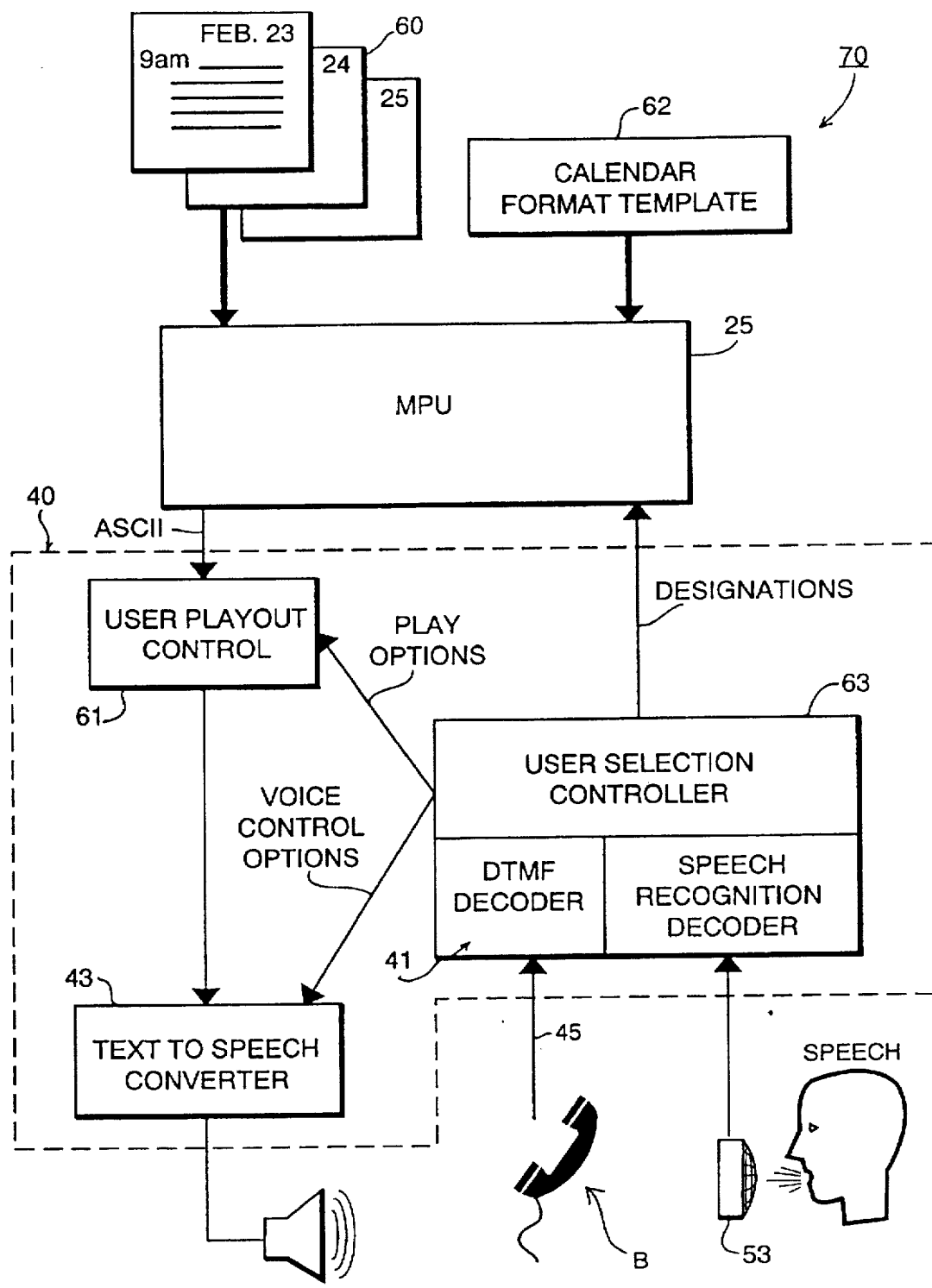
FIG. 7 shows a second embodiment of the invention used in connection with calendar files.

Referring to FIG. 7, there is shown an embodiment 70 of a calendar text-to-speech convertor with respect to the same hardware configuration as illustrated in FIG. 2. Remote calendar text file retrieval is performed much in the same fashion as remote E-mail text file retrieval. Therefore, the second embodiment includes primarily the same hardware features as the E-mail text-to-file convertor 20.

When a user calls the user selection controller 63 via the telephone interface 40, user selection controller 63 within telephone interface 40 indicates to microprocessor 25 that a telephone inquiry has been received. Microprocessor 25 retrieves a stored player selection menu from file server 21 and automatically supplies it to the text-to-speech convertor 43.

Upon hearing the selections, the user may respond to each selection by depressing touch-tone buttons on telephone B. Depressing touch-tone buttons produces DTMF frequencies. The tones produced are sent across telephone line 45 and received by telephone interface 40. Telephone interface 40 includes a DTMF frequency decoder 41 which interprets each dual tone modulated frequency as a command. Each command correlates to a playout selection. Each command is then sent to microprocessor 25 which performs an extraction sequence in accordance with the user selection. In accordance with a user selection, microprocessor 25 retrieves both the calendar file and calendar format template 62 from file server 21. Calendar format template 62 provides position location in a computer usable format template. In this manner, microprocessor 25 can readily locate calendar information with a structured hierarchical calendar data file.

In more detail, calendar format template 62 will be discussed with respect to FIGS. 6 and 8. FIG. 8 provides an illustration of a computer usable format template which provides position location information for the Microsoft calendar format illustrated in FIG. 6. Format template 62 provides location information for calendar appointments within calendar format file 60. For example, at the reference letter D in calendar format template 62, there is illustrated position location information for "time of appointment". The computer usable format template indicates to microprocessor 25 that an appointment time can be found at "location 5", the size of the "time" data in the field is 2 bytes, and the time should be spoken in the format of "hour-:minutes".

In addition to location information, some fields within calendar format template 62 provide information regarding type of appointment. At reference letter E, there is illustrated an "appointment type" field. The "appointment type" is indicated in calendar file 60 by a bit setting found within location 5 of the calendar data file. For example, bit setting 2 indicates that there is a luncheon appointment.

In accordance with format template 62 and a user's selection, those portions of the calendar file that have been selected will be extracted and sent to user playout controller 61. The user will select a playout option based on the menu provided by microprocessor 25. The portions of the desired calendar selections are sent to text-to-speech convertor 43 in accordance with the playout control selection.

The user also has the option to select a voice control option. The voice control option allows the user to select the tone and pitch of the voice. In this manner, the monotonous tone of the synthesized speech can be varied to a more desirable speech pattern.

Figure 9A:
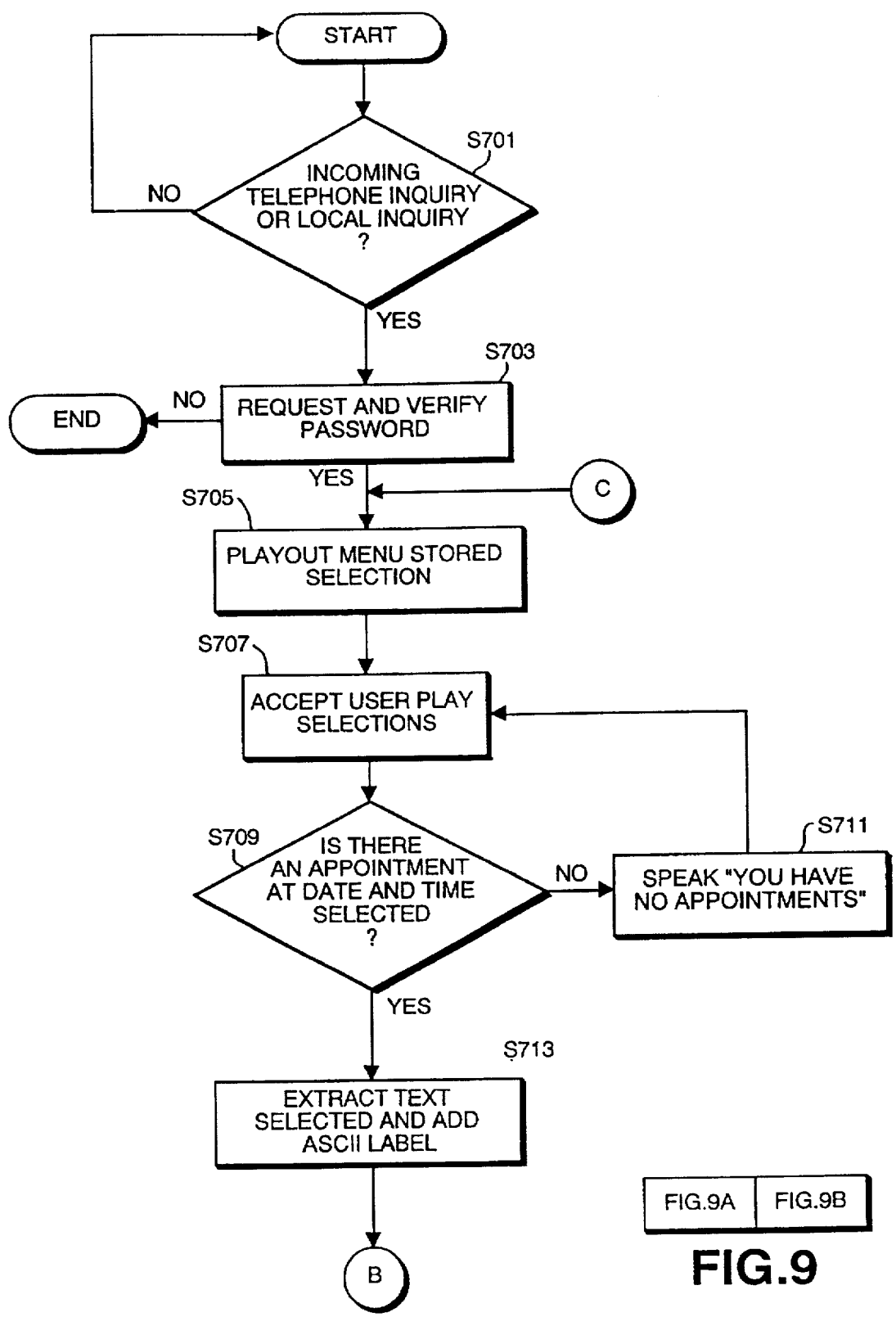
FIG. 9A and 9B show a flow diagram that illustrates the operation of remotely or locally accessing calendar appointments.
Figure 9B:
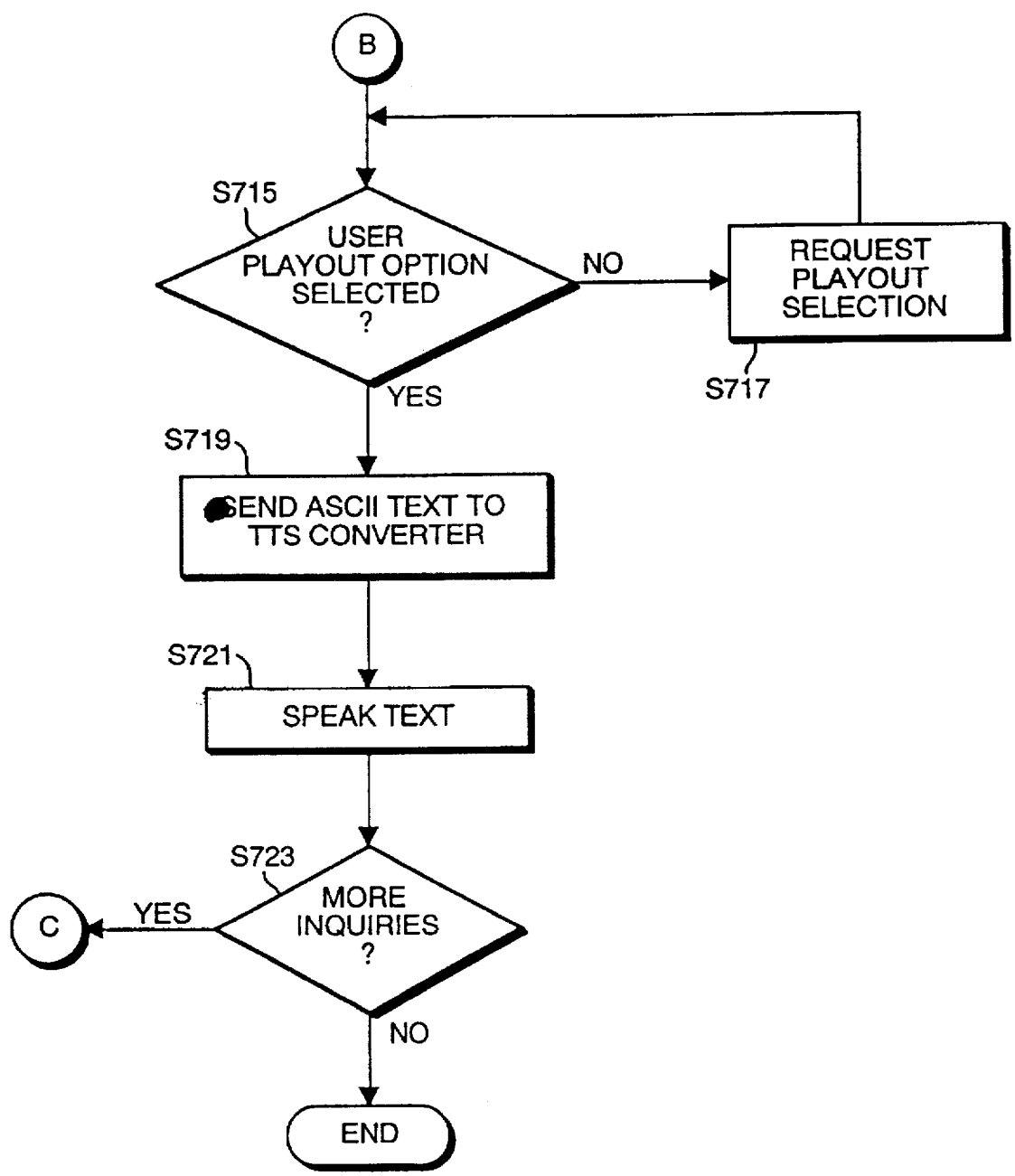

FIG. 9A and 9B are flow diagram that illustrates remote accessing of calendar appointments by calendar text-to-speech convertor 70.

In step S701, microprocessor 25 monitors whether there is an incoming telephone inquiry or a local inquiry. Until an incoming telephone inquiry or a local voice inquiry is detected in step S701, microprocessor 25 simply reinitiates its line monitoring operation and remains in the monitoring loop. However, if an inquiry is detected, flow advances to step S703. In step S703, microprocessor 25 requests a password from the user and a determination is made as to whether the entered password is valid. In the case that the entered password is invalid, the telephone line is disconnected. If the password is recognized in step S703, then flow advances to step S705.

In step S705, microprocessor 25 retrieves from file server 21 pre-stored menu selections and sends the pre-stored menu selections in the form of ASCII text to text-to-speech convertor 43. After receiving the ASCII text, text-to-speech convertor 43 converts the text and speaks the menu selections to the user. In step S707, the player selects his option and flow advances to step S709. In step S709, microprocessor 25 determines if there is an appointment at the date and time selected. If date and/or time selected in step S709 does not include an appointment, then in step S711, microprocessor 25 retrieves from file server 21 ASCII text and sends the ASCII text to text-to-speech convertor 43 which speaks to the user that "no appointments exist" and flow returns to step S707.

On the other hand, in step S709, if it is determined that an appointment exists at the date and time selected, flow advances to step S713 at which point text is extracted and ASCII labels are attached. In step S715, microprocessor 25 determines if the user has selected a playout option. If it is determined in step S715 that the user has not selected a playout option, in step S717, microprocessor 25 sends a request for a playout selection in the form of ASCII text to text-to-speech convertor 43. If in the case a playout selection has been requested, the extracted text is sent to text-to-speech convertor 43 in step S719. In step S721, the selected text field is spoken.

After the text is spoken in step S721, flow advances to step S723 at which point microprocessor 25 queries the user if there are any further calendar inquiries. If it is determined in step S723 that there are further calendar inquiries, flow returns to step S705. However, in the case where there are no further inquiries, the signal through telephone line 45 to telephone interface 40 is disconnected.

The foregoing list of commands is representative only and other commands may be provided by the computer. However, if the computer does not recognize the command, then flow simply returns to step S709 where the line loop is reinitiated.

What is claimed is:

1. Apparatus for outputting selected fields for one of plural differently-structured data files which are each partitioned into plural types of fields, said plural differently-structured data files being produced by different plural software applications, respectively, the apparatus comprising:

configuration means for configuring a user-customizable format template which corresponds to a user-selected one of the differently-structured data files, said user-customizable format template comprising a non-executable data file which includes field identifiers for identifying a type of each field in the user-selected one of the differently-structured data files, and positional field information for defining a relative location of each field in the user-selected one of the differently-structured data files;

a storage device for storing the user-customizable format template and the plural differently-structured data files;

a selector for selecting at least one type of field from the user-selected one of the differently-structured data files;

an extractor for extracting a selected type of field from the user-selected one of the differently-structured data files, the extractor using the field identifier and the positional field information in the user-customizable format template to scan the user-selected one of the differently-structured data files to locate the selected type of field;

a generator for generating a field label corresponding to the field identifier of the selected type of field in the user-customizable format template; and an output device for controllably outputting the generated field label and the extracted field;

wherein the selector, the extractor, the generator and the output device all operate independently of an application which produced the selected one of the differently-structured data files.

2. An apparatus according to claim 1, wherein the selector selects text-type fields within the selected one of the differently-structured data files in accordance with the positional field information provided in the user-customizable format template.

3. An apparatus according to claim 1, wherein the selector is comprised by a telephone interface responsive to dual tone modulated frequency commands; and wherein the telephone interface converts the dual tone modulated frequency commands into field selections and outputs selections for controlling the output device.

4. An apparatus according to claim 1, wherein the plural differently-structured data files stored in the storage device are electronic mail files; and wherein the selector selects an electronic mail field within an electronic mail file based on the field identifier and the positional field information of the selected field provided in the user-customizable format template.

5. An apparatus according to claim 1, wherein the selector can operate in two modes, a first mode for performing automatic selection of predetermined fields and a second mode for performing manual selection of at least one of plural fields.

6. An apparatus according to claim 1, wherein the extractor generates ASCII text identifiers of the types of fields selected in accordance with a location within the structured file format.

7. An apparatus according to claim 6, wherein the extractor detects predesignated character sequences and generates ASCII identifiers for character sequence.

8. An apparatus according to claim 1, further comprising a controller;

wherein the extractor extracts data at predetermined marker positions within each field of each differently-structured data file and the controller controls the output device in accordance with each marker.

9. An apparatus according to claim 1, further comprising a text-to-speech convertor for converting output of the output device into synthesized speech.

10. An apparatus according to claim 2, wherein the differently-structured data files are calendar scheduling files and the selector selects a calendar schedule field within a calendar schedule file based on the field identifier and the positional field information of the selected field provided in the user-customizable format template.

11. An apparatus according to claim 3, further comprising a controller for controlling the output device;

wherein the controller controls the output device to output a generated field label and an extracted field in accordance with the converted dual tone modulated frequency commands.

12. An apparatus according to claim 8, wherein the controller controls the output device to jump to predesignated marker positions.

13. An apparatus according to claim 8, wherein the controller controls the output device to reposition to a predesignated marker within a field.

14. An apparatus according to claim 8, wherein the controller is comprised by a telephone interface responsive to dual tone modulated frequency commands.

15. An apparatus according to claim 8, wherein the controller controls the output means to back up and repeat output.

16. An apparatus according to claim 9, wherein the text-to-speech convertor is comprised by a telephone interface responsive to dual tone modulated frequency commands.

17. An electronic mail text-to-speech apparatus by which synthesized speech signals can be generated for selected fields in any one of plural differently-structured electronic mail files, said plural differently-structured electronic mail files being produced by different plural software applications, respectively, the apparatus comprising:

a processing unit including a computer for executing stored program process steps;

a memory for storing (1) plural differently-structured electronic mail files partitioned into plural types of fields, (2) user-customizable format templates, each comprising a non-executable data file which includes field identifiers for identifying a type of each field in one of the plural differently-structured electronic mail files, and positional field information for defining relative locations of each field in the one of the plural differently-structured electronic mail files, and (3) process steps for execution by the processing unit;

configuration means for configuring a user-customizable format template in accordance with a user-selected one of the plural differently-structured electronic mail files;

a telephone interface including a dual tone modulated frequency decoder for decoding a dual tone modulated frequency signal and for providing the decoded signal to the processing unit; and a text-to-speech convertor for generating electrical signals representing synthesized speech corresponding to a text field provided by the processing unit;

wherein the process steps stored in said memory include steps to accept plural differently-structured electronic mail files from an external device and to store the plural differently-structured electronic mail files in the memory, and in response to dual tone modulated frequency commands, to select at least one of the plural differently-structured electronic mail files from the memory, to retrieve from said memory a user-customizable format template corresponding to a selected one of the plural differently-structured electronic mail files, to extract at least one field from the selected one of the plural differently-structured electronic mail files using a field identifier and positional field information in a retrieved user-customizable format template to scan the selected one of the plural differently-structured electronic mail files to locate the at least one field, and to output controllably the field identifier from the format template and an extracted field to the text-to-speech convertor in accordance with dual tone modulated frequency playout commands; and wherein the selection step, the retrieving step, the extracting step and the output step are all performed independently of the application which produced the selected one of the structured electronic mail files.

18. A method for outputting a selected type of field from any one of plural differently-structured data files which are each partitioned into plural types of fields, said plural differently-structured data files being produced by different plural software applications, respectively, said method comprising the steps of:

storing the plural differently-structured data files and a user-customizable format template;

replying to an incoming telephone inquiry to playout the plural differently-structured data files;

accepting, in response to the replying step, a selection option for selecting one of the plural differently-structured data files and for selecting at least one type of field;

configuring a user-customizable format template which corresponds to a user-selected one of the differently-structured data files, the user-customizable format template comprising a non-executable data file which includes field identifiers for identifying a type of each field in the user-selected one of the differently-structured data files, and positional field information for defining a relative location of each field in the user-selected one of the differently-structured data files;

extracting, in accordance with the selection option, a selected type of field from the user-selected one of the differently-structured data files based on the field identifier and the positional field information provided in the user-customizable format template, the extracting step using the field identifier and the positional field information to scan the user-selected one of the differently-structured data files to locate the selected field; and playing an extracted field and the field identifier for the extracted field over a telephone;

wherein the accepting step, the selecting step, the extracting step and the playing step are all performed independently of the application which produced the user-selected one of the differently-structured data files.

19. A method according to claim 18, further comprising the step of accepting electronic mail messages for selecting one of the plural differently-structured data files and for selecting at least one type of field.

20. A method according to claim 18, wherein the step of accepting is performed using a telephone interface responsive to dual tone modulated frequency commands.

21. A method according to claim 18, wherein the plural differently-structured data files comprise plural electronic mail files.

22. A method according to claim 18, wherein the step of playing further comprises controlling output over the telephone in accordance with a telephone interface responsive to dual tone modulated frequency commands.

23. A method according to claim 19, wherein the step of replying further comprises the step of outputting selection options.

24. A method according to claim 19, wherein the storing step stores a calendar file entry.

25. A method according to claim 23, wherein the selection options comprise text-to-speech stored selections.

26. An apparatus for extracting fields from any one of plural differently-structured data files and for generating synthesized speech in accordance with extracted fields, said plural differently-structured data files being produced by different plural software applications, respectively, the apparatus comprising:

a processor for executing stored process steps;

a storage device for storing (1) plural differently-structured data files partitioned into plural types of fields, (2) user-customizable format templates which comprise non-executable data files, each of which includes a field identifier for identifying a type of each field in one of the plural differently-structured data files, and positional field information defining relative locations of each field within one of the differently-structured data files, and (3) process steps for execution by said processor;

configuration means for configuring the user-customizable format template in accordance with a user-selected one of the differently-structured data files;

an interface for accepting dual tone modulated frequency signals, each dual tone modulated frequency signal representing a selection of one of the plural differently-structured data files; and a text-to-speech convertor for converting electronic signals into synthesized speech corresponding to a field of a structured data file, wherein the processor selects one of the plural differently-structured data files in accordance with a first dual tone modulated frequency signal, retrieves a user-customizable format template from the storage device, extracts selected fields from a selected one of the plural differently-structured data files using a field identifier and positional field information provided in the user-customizable format template to scan the selected one of the plural differently-structured data files to locate the selected field, generates field identification labels in correspondence to the field identifier in the user-customizable format template, and controllably outputs the field identifier and extracted fields to the text-to-speech convertor in accordance with a second dual tone modulated frequency signal;

wherein the selecting, retrieving, extracting, generating and outputting performed by the processor are performed independently of the application which produced the selected one of the plural differently-structured data files.

27. A calendar file text-to-speech apparatus by which synthesized speech signals can be generated for selected fields in any one of plural differently-structured calendar files, said plural differently-structured calendar files being produced by different plural applications, respectively, said apparatus comprising:

a processing unit including a computer for executing stored program process steps;

a memory for storing (1) plural differently-structured calendar files partitioned into plural types of fields, (2) user-customizable format templates, each comprising a non-executable data file which includes field identifiers for identifying a type of field and positional field information for defining relative locations of each field in each of the plural differently-structured calendar files, and (3) process steps for execution by the processing unit;

configuration means for configuring a user-customizable format template in accordance with a user-selected one of the plural differently-structured calendar files;

a telephone interface including a dual tone modulated frequency decoder for decoding a dual tone modulated frequency signal and for providing the decoded signal to the processing unit; and a text-to-speech convertor for generating electrical signals representing synthesized speech corresponding to a text field provided by the processing unit;

wherein the process steps stored in said memory include steps to retrieve a calendar file and its associated user-customizable format template, and in response to dual tone modulated frequency commands, to select types of fields in a retrieved calendar file, to extract at least one field from the retrieved calendar file using a field identifier and positional field information in the associated user-customizable format template to scan the calendar file to locate selected types of fields in the calendar file, and controllably to output a field identifier from the user-customizable format template and an extracted field to the text-to-speech convertor in accordance with dual tone modulated frequency playout commands; and wherein the retrieving step, the selecting step, the extracting step and the output step are all performed independently of the application which produced the structured calendar file.

* * * * *

UNITED STATES PATENT AND TRADEMARK OFFICE
CERTIFICATE OF CORRECTION

PATENT NO. : 5,715,370
DATED : February 3, 1998
INVENTOR(S) : Willis J. Luther, et al.

It is certified that error appears in the above-identified patent and that said Letters Patent is hereby corrected as shown below:

On the cover page, under the "References Cited" heading, insert the following: item [56]

```
--4,716,583    12/1987    Groner, et al.
  5,272,628    12/1993    Koss
  5,267,155    11/1993    Buchanan, et al.
  5,163,085    11/1992    Sweet, et al.
```

FOREIGN PATENT DOCUMENTS

```
  215,309      3/1987     European Patent Office
```

OTHER PUBLICATIONS

"Printing Changed Calendar Pages", IBM Technical Bulleting, August 1990, Vol. 33, No. 3A, pp. 271-273.--

Column 3, line 6, change "FIG. 5A" to --FIGS. 5, 5A--;

line 15, change "FIG. 9A" to --FIGS. 9, 9A--; and line 51, change "provides," to --provides--.

UNITED STATES PATENT AND TRADEMARK OFFICE
CERTIFICATE OF CORRECTION

PATENT NO. : 5,715,370
DATED : February 3, 1998
INVENTOR(S) : Willis J. Luther, et al.

It is certified that error appears in the above-identified patent and that said Letters Patent is hereby corrected as shown below:

Column 5, line 66, change "FIG. 5A" to --FIGS. 5A--.

Column 6, line 24, delete the first occurrence of "the".

Column 8, line 1, change "FIG. 9A" to --FIGS. 9A--, and change "diagram" to --diagrams--.

Column 11, line 66, change "claim 19," to --claim 18,--.

Signed and Sealed this

Thirtieth Day of March, 1999

Attest:

Q. TODD DICKINSON

*Attesting Officer*     *Acting Commissioner of Patents and Trademarks*